US011751113B2

(12) United States Patent
Damnjanovic et al.

(10) Patent No.: US 11,751,113 B2
(45) Date of Patent: *Sep. 5, 2023

(54) USER EQUIPMENT AUTONOMOUS SERVING CELL SELECTION IN NEW RADIO

(71) Applicant: Qualcomm Incorporated, San Diego, CA (US)

(72) Inventors: Aleksandar Damnjanovic, Del Mar, CA (US); Keiichi Kubota, Tokyo (JP); Linhai He, San Diego, CA (US); Gavin Bernard Horn, La Jolla, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/688,596

(22) Filed: Mar. 7, 2022

(65) Prior Publication Data
US 2022/0272595 A1 Aug. 25, 2022

Related U.S. Application Data

(63) Continuation of application No. 16/490,699, filed as application No. PCT/CN2017/079443 on Apr. 5, 2017, now Pat. No. 11,272,412.

(51) Int. Cl.
H04W 36/10 (2009.01)
H04W 36/00 (2009.01)
(Continued)

(52) U.S. Cl.
CPC ....... H04W 36/10 (2013.01); H04W 36/0085 (2018.08); H04W 36/30 (2013.01); H04W 36/36 (2013.01)

(58) Field of Classification Search
None
See application file for complete search history.

(56) References Cited

U.S. PATENT DOCUMENTS

| 11,272,412 B2 * | 3/2022 | Damnjanovic | ....... H04W 36/10 |
| 2010/0124172 A1 * | 5/2010 | Tenny | ................... H04W 24/08 |
| | | | 370/242 |

(Continued)

FOREIGN PATENT DOCUMENTS

| CN | 101562859 A | 10/2009 |
| CN | 103781136 A | 5/2014 |

(Continued)

OTHER PUBLICATIONS

European Search Report—EP17904762—Search Authority—Munich—dated Sep. 28, 2020.

(Continued)

Primary Examiner — Saad Khawar
(74) Attorney, Agent, or Firm — Holland & Hart / Qualcomm

(57) ABSTRACT

Methods, systems, and devices for wireless communication are described. A user equipment (UE) may autonomously initiate a handover procedure and select a target base station for the handover procedure. The UE may measure a signal from the source base station or the target base station, or both, and the UE may determine whether specific criteria at both base stations are within a pre-configured range. If the criteria at both base stations are within the pre-configured range, the UE may identify the target base station as a potential candidate for a handover. Accordingly, when the UE determines that radio conditions with the source base station are deteriorating (or fall below a threshold), the UE (Continued)

may initiate a handover to the target base station autonomously and without specific direction from the source base station.

20 Claims, 13 Drawing Sheets

(51) Int. Cl.
*H04W 36/30* (2009.01)
*H04W 36/36* (2009.01)

(56) References Cited

U.S. PATENT DOCUMENTS

| | | | |
|---|---|---|---|
| 2011/0171925 | A1 | 7/2011 | Faccin et al. |
| 2013/0065597 | A1 | 3/2013 | Hole |
| 2013/0273920 | A1 | 10/2013 | Magadi Rangaiah et al. |
| 2014/0204829 | A1 | 7/2014 | Wang et al. |
| 2015/0133121 | A1 | 5/2015 | Li et al. |
| 2016/0192270 | A1 | 6/2016 | Xu et al. |
| 2016/0345222 | A1 | 11/2016 | Axmon et al. |
| 2016/0381610 | A1 | 12/2016 | Pu et al. |
| 2018/0213457 | A1 | 7/2018 | Tang et al. |
| 2018/0227805 | A1 | 8/2018 | Jang et al. |
| 2018/0302831 | A1* | 10/2018 | Fan .................. H04W 36/0022 |
| 2019/0380067 | A1* | 12/2019 | Rosa ................. H04W 36/0061 |
| 2020/0015136 | A1 | 1/2020 | Damnjanovic et al. |
| 2020/0305038 | A1 | 9/2020 | Tooher et al. |

FOREIGN PATENT DOCUMENTS

| | | |
|---|---|---|
| CN | 105101315 A | 11/2015 |
| CN | 105323726 A | 2/2016 |
| CN | 106537985 A | 3/2017 |
| WO | WO0147298 A2 | 6/2001 |

OTHER PUBLICATIONS

Huawei, et al: "Analysis on Conditional Handover", 3GPP Draft, 3GPP TSG-RAN WG2 #97bis, R2-1703384 Analysis on Conditional Handover, 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017 (Apr. 3, 2017), XP051245246, 7 Pages, Retrieved from the Internet: URL: http://www.3gpp.org/ftp/Meetings_3GPP_SYNC/RAN2/Docs/, [retrieved on Apr. 3, 2017], the whole document.
Intel Corporation: "Analysis of Conditional Handover", 3GPP Draft, 3GPP TSG RAN WG2 Meeting #97bis, R2-1703415, 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Mar. 27, 2017 (Mar. 27, 2017), XP051254656, pp. 1-4, Retrieved from the Internet: URL: http://www.3gpp.org/ftp/tsg_ran/WG2_RL2/TSGR2_97bis/Docs/, [retrieved on Mar. 27, 2017], the whole document.
International Preliminary Report on Patentability—PCT/CN2017/079443, The International Bureau of WIPO—Geneva, Switzerland, dated Oct. 17, 2019.
International Search Report and Written Opinion—PCT/CN2017/079443—ISA/EPO—dated Jan. 9, 2018.
KT Corp: "Discussion on UE Based Autonomous Handover", 3GPP Draft, 3GPP TSG-RAN WG2 #97bis, R2-1703083, 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017 (Apr. 3, 2017), XP051245023, pp. 1-2, Retrieved from the Internet: URL: http://www.3gpp.org/ftp/Meetings_3GPP_SYNC/RAN2/Docs/, [retrieved on Apr. 3, 2017], the whole document.
Supplementary European Search Report—EP17904762—Search Authority—Munich—dated Sep. 28, 2020.

* cited by examiner

USER EQUIPMENT AUTONOMOUS SERVING CELL SELECTION IN NEW RADIO

CROSS-REFERENCE TO RELATED APPLICATIONS

The present Application for Patent is a Continuation of U.S. patent application Ser. No. 16/490,699 by DAMN-JANOVIC et al., entitled "USER EQUIPMENT AUTONOMOUS SERVING CELL SELECTION IN NEW RADIO" filed Sep. 3, 2019, which is a 371 of Chinese PCT Patent Application No. PCT/CN2017/079443 by DAMN-JANOVIC et al., entitled "USER EQUIPMENT AUTONOMOUS SERVICING CELL SELECTION IN RADIO," filed Apr. 5, 2017, and assigned to the assignee hereof. The disclosures of the prior Applications are considered part of and are incorporated by reference in this Patent Application.

BACKGROUND

The following relates generally to wireless communication and more specifically to user equipment (UE) autonomous serving cell selection in new radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a NR system).

A wireless multiple-access communications system may include a number of base stations or access network nodes, each simultaneously supporting communication for multiple communication devices, which may be otherwise known as UE. Some wireless systems may have rapidly changing radio conditions that give rise to radio link failures (RLFs). Network-only or base station-centric mobility solutions may be unable to respond to such issues in a timely or efficient fashion.

SUMMARY

As described herein, a user equipment (UE) may autonomously initiate a handover procedure and select a target base station for the handover procedure. The UE may measure a signal at a source base station or a target base station, or both, and the UE may determine whether specific criteria at either or both base stations are within a pre-configured range for autonomous handover.

If the criteria at both base stations are within the pre-configured range, the UE may identify the target base station as a potential candidate for a handover. Accordingly, in some examples, when the UE determines that radio conditions with the source base station are poor (or fall below a threshold), the UE may initiate a handover to the target base station These techniques may prevent radio link failure (RLF) between a UE and a source base station, which may result in increased throughput in a wireless communications system.

A method of wireless communication at a UE is described. The method may include receiving, from a source cell, a range of values for at least one criterion for autonomous cell selection; identifying resources on which to transmit an indication of a target cell from a set of candidate cells configured for UE autonomous cell selection; measuring a signal for one or more of the candidate cells; determining, by the UE, that the at least one criterion is within the range of values based at least in part on measuring the signal for the one or more candidate cells; and selecting the target cell from the one or more candidate cells or avoiding selection of the target cell after determining that the at least one criterion is within the range of values.

An apparatus for wireless communication is described. The apparatus may include means for receiving, from a source cell, a range of values for at least one criterion for autonomous cell selection; means for identifying resources on which to transmit an indication of a target cell from a set of candidate cells configured for autonomous cell selection; means for measuring a signal for one or more of the candidate cells; means for determining that the at least one criterion is within the range of values based at least in part on measuring the signal for the one or more candidate cells; and means for selecting the target cell from the one or more candidate cells or avoiding selection of the target cell after determining that the at least one criterion is within the range of values.

Another apparatus for wireless communication is described. The apparatus may include a processor, memory in electronic communication with the processor, and instructions stored in the memory. The instructions may be operable to cause the processor to receive, from a source cell, a range of values for at least one criterion for autonomous cell selection; identify resources on which to transmit an indication of a target cell from a set of candidate cells configured for autonomous cell selection; measure a signal for one or more of the candidate cells; determine that the at least one criterion is within the range of values based on measuring the signal for the one or more candidate cells; and select the target cell from the one or more candidate cells or avoiding selection of the target cell after determining that the at least one criterion is within the range of values.

A non-transitory computer readable medium for wireless communication is described. The non-transitory computer-readable medium may include instructions operable to cause a processor to receive, from a source cell, a range of values for at least one criterion for autonomous cell selection; identify resources on which to transmit an indication of a target cell from a set of candidate cells configured for autonomous cell selection, measure a signal for one or more of the candidate cells; determine that the at least one criterion is within the range of values based on measuring the signal for the one or more candidate cells; and select the target cell from the one or more candidate cells or avoiding selection of the target cell after determining that the at least one criterion is within the range of values.

Some examples of the method, apparatus, and non-transitory computer-readable medium described above may further include processes, features, means, or instructions for transmitting, to the source cell and to the target cell on the identified resources, the indication of the target cell. In some examples, the identified resources include a set of common resources. In some examples, the indication may be transmitted to the source cell on a first set of resources of the identified resources and to the target cell on a second set of resources of the identified resources.

Some examples of the method, apparatus, and non-transitory computer-readable medium described above may further include processes, features, means, or instructions for receiving an assignment of resources from the target cell. Some examples may further include processes, features, means, or instructions for communicating with the target cell based on receiving the assignment of resources. In some examples, receiving the assignment of resources includes receiving the assignment of resources within a threshold time after transmitting the indication of the target cell.

Some examples of the method, apparatus, and non-transitory computer-readable medium described above may further include processes, features, means, or instructions for monitoring a first control channel of the source cell during a first subset of a set of transmission time intervals (TTIs) after transmitting the indication of the target cell. Some examples may further include processes, features, means, or instructions for monitoring a second control channel of the target cell during a second subset of the set of TTIs after transmitting the indication.

In some examples of the method, apparatus, and non-transitory computer-readable medium described above, measuring the signal includes measuring at least one of a reference signal received power (RSRP), reference signal received quality (RSRQ), or a signal-to-interference-plus-noise ratio (SINR), or any combination thereof. In some examples, the at least one criterion includes a ratio of a first RSRP of the source cell to a second RSRP of the target cell, a ratio of a first RSRQ of the source cell to a second RSRQ of the target cell, or a ratio of a first SINR of the source cell to a second SINR of the target cell, or any combination thereof.

Some examples of the method, apparatus, and non-transitory computer-readable medium described above may further include processes, features, means, or instructions for receiving radio resource control (RRC) signaling, broadcast information, or downlink control information (DCI), or a combination thereof that indicates the resources on which to transmit the indication of the target cell. In some examples of the method, apparatus, and non-transitory computer-readable medium described above, the RRC signaling includes unicast or broadcast signaling.

Some examples of the method, apparatus, and non-transitory computer-readable medium described above may further include processes, features, means, or instructions for receiving an indication of a transmit power to use to transmit the indication of the target cell to the source cell and the target cell. In some examples, the indication of the transmit power includes an indication of a common transmit power to use to transmit the indication of the target cell to the source cell and the target cell. In some examples, the indication of the transmit power includes an indication of a first transmit power to use to transmit the indication of the target cell to the source cell and a second transmit power to use to transmit the indication of the target cell to the target cell.

Some examples of the method, apparatus, and non-transitory computer-readable medium described above may further include processes, features, means, or instructions for transmitting one or more measurement reports to the source cell, where the range of values for the at least one criterion for autonomous cell selection is received in response to the one or more measurement reports. In some examples of the method, apparatus, and non-transitory computer-readable medium described above, the one or more measurement reports include a measurement report for the source cell and one or more measurement reports for one or more of the candidate cells. In some examples of the method, apparatus, and non-transitory computer-readable medium described above, the target cell may be selected based on radio conditions for communications with the source cell. Some examples of the method, apparatus, and non-transitory computer-readable medium described above may further include processes, features, means, or instructions for receiving an indication of the set of candidate cells configured for autonomous cell selection.

Some examples of the method, apparatus, and non-transitory computer-readable medium described above may further include processes, features, means, or instructions for receiving an indication of a minimum time between handovers. Some examples may further include processes, features, means, or instructions for determining that the minimum time may have elapsed since a previous handover. Some examples may further include processes, features, means, or instructions for selecting the source cell for a handover based on the determination that the minimum time may have elapsed.

A method of wireless communication is described. The method may include transmitting, to a UE, a range of values for at least one criterion for autonomous cell selection; identifying resources to monitor for an indication of a target cell from a set of candidate cells configured for autonomous cell selection; and receiving, from the UE on the identified resources, the indication of the target cell.

An apparatus for wireless communication is described. The apparatus may include means for transmitting, to a UE, a range of values for at least one criterion for autonomous cell selection; means for identifying resources to monitor for an indication of a target cell from a set of candidate cells configured for autonomous cell selection; and means for receiving, from the UE on the identified resources, the indication of the target cell.

Another apparatus for wireless communication is described. The apparatus may include a processor, memory in electronic communication with the processor, and instructions stored in the memory. The instructions may be operable to cause the processor to transmit, to a UE, a range of values for at least one criterion for autonomous cell selection; identify resources to monitor for an indication of a target cell from a set of candidate cells configured for autonomous cell selection; and receive, from the UE on the identified resources, the indication of the target cell.

A non-transitory computer readable medium for wireless communication is described. The non-transitory computer-readable medium may include instructions operable to cause a processor to transmit, to a UE, a range of values for at least one criterion for autonomous cell selection; identify resources to monitor for an indication of a target cell from a set of candidate cells configured for autonomous cell selection; and receive, from the UE on the identified resources, the indication of the target cell.

Some examples of the method, apparatus, and non-transitory computer-readable medium described above may further include processes, features, means, or instructions for receiving, from the UE, an indication of the source cell after a threshold time after receiving the indication of the target cell. Some examples may further include processes, features, means, or instructions for communicating with the UE based on receiving the indication of the source cell. Some examples of the method, apparatus, and non-transitory computer-readable medium described above may further include processes, features, means, or instructions for receiving one or more measurement reports from the UE, where the range of values for the at least one criterion for autonomous cell selection is transmitted in response to the one or more measurement reports.

A method of wireless communication is described. The method may include identifying resources to monitor for an indication of the target cell from a set of candidate cells configured for autonomous cell selection; receiving, from a UE on the identified resources, the indication of the target cell; determining whether to assign resources for communication with the UE; and transmitting an assignment of resources or refraining from transmitting an assignment of resources to the UE based on the determination.

An apparatus for wireless communication is described. The apparatus may include means for identifying resources to monitor for an indication of the target cell from a set of candidate cells configured for autonomous cell selection; means for receiving, from a UE on the identified resources, the indication of the target cell; means for determining whether to assign resources for communication with the UE; and means for transmitting an assignment of resources or refraining from transmitting an assignment of resources to the UE based on the determination.

Another apparatus for wireless communication is described. The apparatus may include a processor, memory in electronic communication with the processor, and instructions stored in the memory. The instructions may be operable to cause the processor to identify resources to monitor for an indication of the target cell from a set of candidate cells configured for autonomous cell selection; receive, from a UE on the identified resources, the indication of the target cell; determine whether to assign resources for communication with the UE; and transmit an assignment of resources or refraining from transmitting an assignment of resources to the UE based on the determination.

A non-transitory computer readable medium for wireless communication is described. The non-transitory computer-readable medium may include instructions operable to cause a processor to identify resources to monitor for an indication of the target cell from a set of candidate cells configured for autonomous cell selection; receive, from a UE on the identified resources, the indication of the target cell; determine whether to assign resources for communication with the UE; and transmit an assignment of resources or refraining from transmitting an assignment of resources to the UE based on the determination.

Some examples of the method, apparatus, and non-transitory computer-readable medium described above may further include processes, features, means, or instructions for communicating with the UE based on transmitting the assignment of resources.

DETAILED DESCRIPTION

A user equipment (UE) may autonomously initiate or indicate a preference for a mobility operation. This may be based on certain criteria provided by a network, and it may improve timely handover or efficient mobility within a system.

By way of example, in some wireless communications systems (e.g., millimeter wave (mmW) systems), radio conditions may change rapidly resulting in frequent failures of communication links (e.g., radio link failure (RLF)) between a source base station and a UE. In such cases, the source base station may initiate a handover procedure for the UE (e.g., triggered by the RLF). Specifically, the source base station may select a target base station and may hand over the UE to the target base station. This type of handover procedure (i.e., network-controlled or network-centric handover procedure) may involve multiple transmissions between the source base station, the target base station, and the UE. As a result, the UE may experience long service interruptions, which may result in reduced throughput in a wireless communications system.

As described herein, a system may support efficient techniques for autonomously selecting a target base station for a handover procedure to prevent RLF. Specifically, the UE may determine the quality of radio conditions associated with communications with a source base station, and the UE may determine to hand over to a target base station if the radio conditions are poor (e.g., below a certain threshold). To select the target base station, the UE may determine if certain conditions at a target base station are within a specific range (e.g., ±3 dB) of the same conditions at a source base station. If the UE determines that the conditions at both base stations are within the specific range, the UE may select the target base station for a handover and initiate the handover procedure to the target base station.

Aspects of the disclosure introduced above are described below in the context of a wireless communications system. Examples of processes and signaling exchanges that support UE autonomous serving cell selection in New Radio (NR) are then described. Aspects of the disclosure are further illustrated by and described with reference to apparatus diagrams, system diagrams, and flowcharts that relate to UE autonomous serving cell selection in NR.

Figure 1:
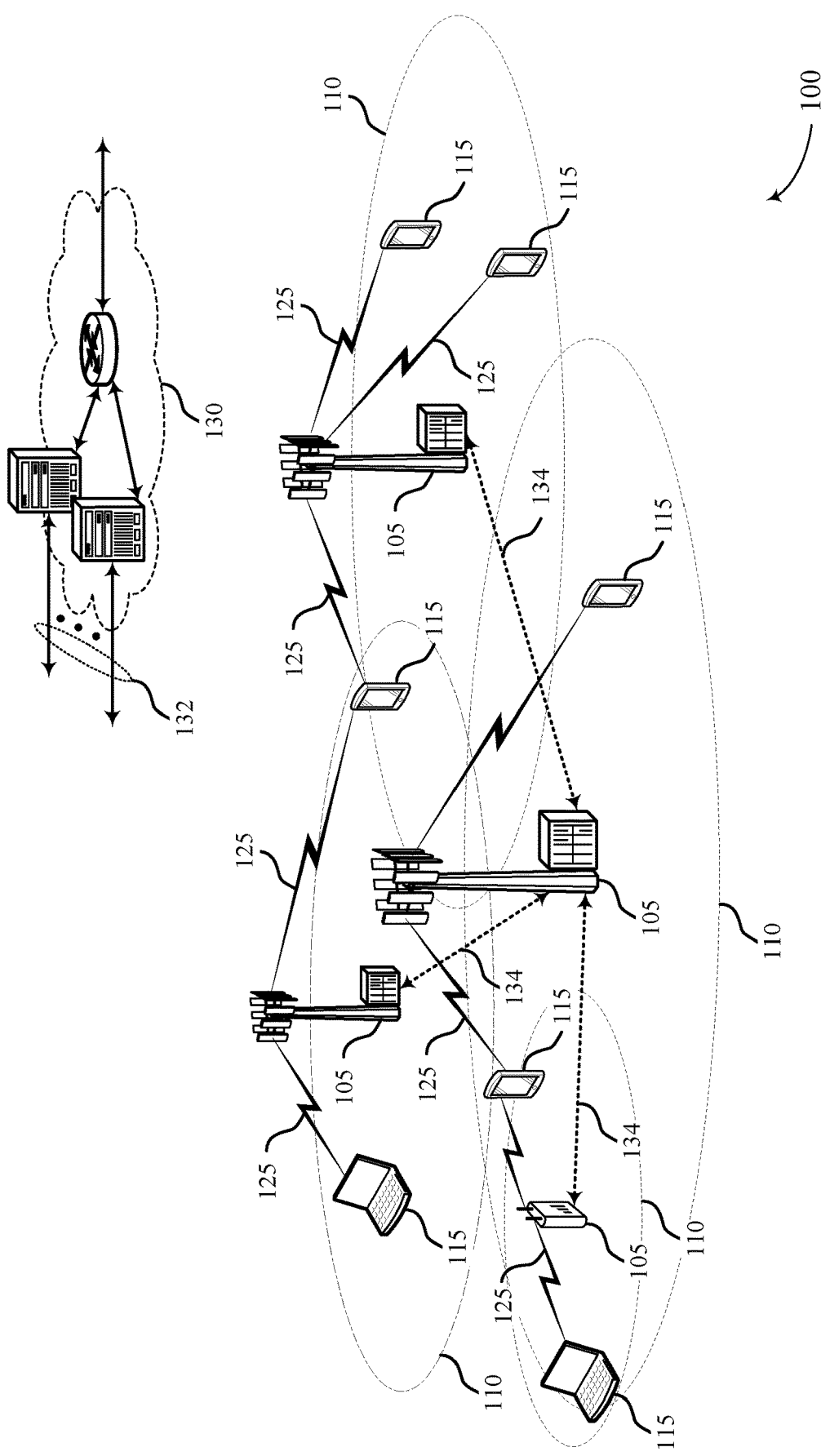
FIG. 1 illustrates an example of a wireless communications system that supports user equipment (UE) autonomous serving cell selection in New Radio (NR) in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Base stations 105 may support autonomous mobility procedures as described herein.

Communication links 125 shown in wireless communications system 100 may include uplink transmissions from a UE 115 to a base station 105, or downlink transmissions, from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, an automobile component, a train, a train component, or the like. UEs 115 may support autonomous mobility procedures as described herein.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. Operations in unlicensed spectrum may include downlink transmissions, uplink transmissions, or both. When operating in unlicensed radio frequency spectrum bands, wireless devices such as base stations 105 and UEs 115 may employ listen-before-talk (LBT) procedures to ensure the channel is clear before transmitting data. That is, the base stations 105 and UEs 115 may contend for access to the spectrum before transmitting data. In some cases, a UE 115 or base station 105 may not be able to access the spectrum before radio conditions between these devices deteriorate causing RLF. In such cases, a wireless communications system may experience reduced throughput. Wireless communications system 100 may support efficient techniques for preventing RLF.

Wireless communications system 100 may support millimeter wave (mmW) communications between UEs 115 and base stations 105. Devices operating in mmW (or high frequency) bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape or steer an overall antenna beam in the direction of a target receiver (e.g., a UE 115). This may be achieved by combining elements in an antenna array in such a way that signals transmitted at particular angles experience constructive interference while others experience destructive interference.

In some wireless communications systems (e.g., mmW systems), radio conditions may change rapidly resulting in frequent failures of communication links (e.g., radio link failure (RLF)) between a source base station 105 and a UE 115. In such cases, a source base station 105 may initiate a handover procedure for a UE 115. Specifically, a source base station 105 may select a target base station 105 and may handover UE 115 to the target base station 105. This type of handover procedure (i.e., network controlled handover procedure) may, however, involve multiple transmissions between a source base station 105, a target base station 105, and a UE 115. As a result, UE 115 may experience long service interruptions during a handover procedure, which may result in reduced throughput in a wireless communications system (e.g., for frequent handovers).

Accordingly, in some cases, a UE 115 may avoid RLF by autonomously initiating a handover procedure (i.e., UE controlled handover procedure/UE based mobility) to access a target base station 105. If a specific criterion measured for a source base station 105 (e.g., reference signal received power (RSRP), reference signal received quality (RSRQ), signal-to-interference-plus-noise ratio (SINR), etc.) falls below a predetermined threshold, a UE 115 may determine to initiate a handover procedure to a target base station 105. In some wireless communications systems, however, it may be challenging for a UE 115 to accurately measure the criteria for a set of base stations 105, which may result in inefficient mobility within a system.

A UE 115 operating in wireless communications system 100 may support efficient techniques for autonomously selecting a target base station 105 for a handover procedure.

For example, UE 115 may measure signals at a source base station 105 and a target base station 105 to determine when it may initiate a handover procedure to the target base station 105. Specifically, UE 115 may determine if one or more measurements associated with a source base station 105 are within a specific range (e.g., ±3 dB) of the same measurements associated with a target base station 105. If the measurements at both base stations are within the specific range, the UE 115 may determine whether to initiate a handover procedure to the target base station 105 based on, for example, the quality of current radio conditions. Accordingly, the UE 115 may rely more on determining if a ratio of measurements is within a specific range and less on determining accurate measurements in wireless communications system 100, resulting in more efficient mobility.

Figure 2:
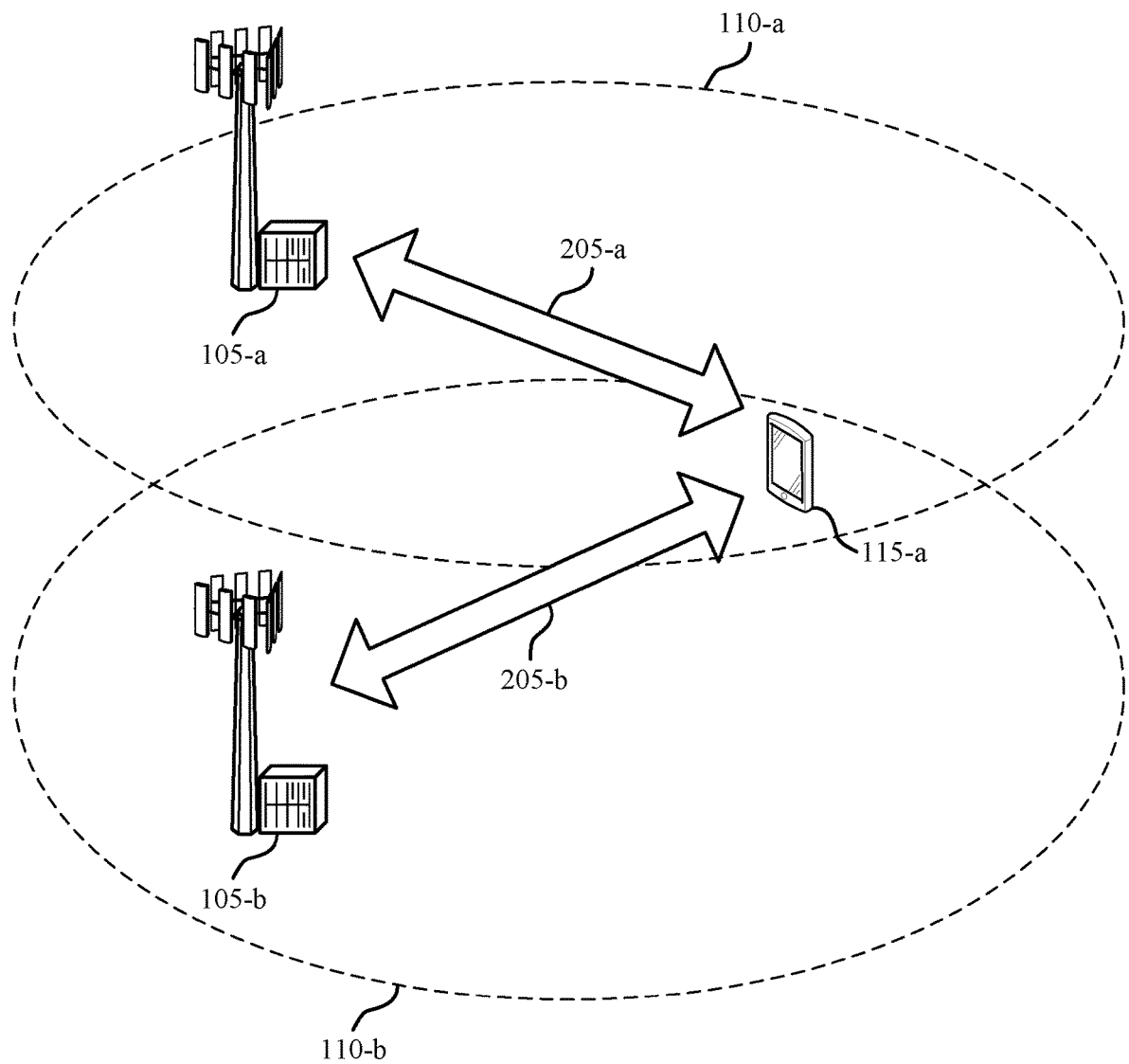
FIG. 2 illustrates an example of a wireless communications system that supports UE autonomous serving cell selection in NR in accordance with various aspects of the present disclosure.

FIG. 2 illustrates an example of a wireless communications system 200 that supports UE autonomous serving cell selection in NR in accordance with various aspects of the present disclosure. Wireless communications system 200 includes source base station 105-a, target base station 105-b, and UE 115-a, which may be examples of a base station 105 or a UE 115 described with reference to FIG. 1. In some cases, UE 115-a may be an example of a UE with limited data rates and low latency requirements. Source base station 105-a provides communication coverage for coverage area 110-a, and target base station 105-b provides communication coverage for coverage area 110-b.

Source base station 105-a may communicate with UE 115-a on resources of a carrier 205-a. While communicating with source base station 105-a, UE 115-a may periodically or aperiodically measure signals (e.g., RSRP, RSRQ, SINR, etc.) for source base station 105-a and target base station 105-b. The UE 115-a may transmit a measurement report to source base station 105-a that includes measurements of signals for both base stations. If no neighboring base stations are detected, UE 115-a may refrain from (i.e., avoid) measuring the signals for source base station 105-a. In some cases, based on the measurements, UE 115-a may autonomously identify one or more target base stations (e.g., target base station 105-b) for a potential handover in the event that radio conditions between UE 115-a and source base station 105-a begin to deteriorate.

UE 115-a may autonomously select target base station 105-b for the potential handover based on a comparison of measurements at source base station 105-a and target base station 105-b. Specifically, UE 115-a may determine if certain measurements at source base station 105-a are within a specific range (e.g., ±3 dB) of the same measurements at target base station 105-b. If UE 115-a determines that the measurements at both base stations are within the specific range, UE 115-a may select target base station 105-b for the potential handover. The target base station may be selected from a set of candidate base stations (e.g., indicated by source base station 105-a). Thus, if UE 115-a determines that current radio conditions with source base station 105-a are poor, UE 115-a may initiate a handover procedure to the target base station 105-b.

If UE 115-a opts to initiate the handover procedure to target base station 105-b, UE 115-a may transmit an indication of target base station 105-b to both source base station 105-a and target base station 105-b on carriers 205-a and 205-b, respectively (e.g., on resources available periodically). In some cases, the resources of carriers 205-a and 205-b used for the transmission of the indication may be configured separately for each base station (i.e., specific to each base station) or jointly for source base station 105-a and target base station 105-b (i.e., on a common set of resources). Similarly, the power used to transmit the indication may be configured separately (i.e., specific to each base station) or jointly (i.e., the same for both base stations). After receiving the indication, target base station 105-b may determine whether to serve as the new source base station for UE 115-a. If target base station 105-b determines to serve as the new source base station for UE 115-a, target base station 105-b may assign resources for communications with UE 115-a (e.g., transmit a scheduling grant allocating resources for communications with UE 115-a). If, however, target base station 105-b determines not to serve as the source base station for UE 115-a, target base station 105-b may refrain from transmitting the scheduling grant.

UE 115-a may monitor a physical downlink control channel (PDCCH) for the assignment of resources (e.g., scheduling grant) from the target base station 105-b. UE 115-a may also monitor another PDCCH simultaneously for control information for communication with source base station 105-a. In some examples, UE 115-a may monitor the PDCCH on carrier 205-a for control information from source base station 105-a during even subframes (e.g., subframes 2, 4, 6, etc.), and UE 115-a may monitor the other PDCCH on carrier 205-b for control information from target base station 105-b during odd subframes (e.g., subframes 1, 3, 5, etc.). UE 115-a may monitor the PDCCH for the assignment of resources from target base station 105-b for a predetermined amount of time before determining to remain connected to source base station 105-a (e.g., cancel the handover procedure).

As an example, UE 115-a may run a timer, and UE 115-a may monitor the PDCCH for the assignment of resources until the timer expires. If UE 115-a receives the assignment of resources before the timer expires, UE 115-a may be handed over to target base station 105-b and may establish a connection with target base station 105-b. Alternatively, if UE 115-a does not receive the assignment of resources before the timer expires, UE 115-a may not be handed over to target base station 105-b. In such cases, UE 115-a may transmit an indication to source base station 105-a, and UE 115-a may continue to be served by source base station 105-a. In addition, to prevent ping-pong handovers, UE 115-a may not attempt a subsequent handover to a new base station within a certain amount of time after a successful handover.

Figure 3:
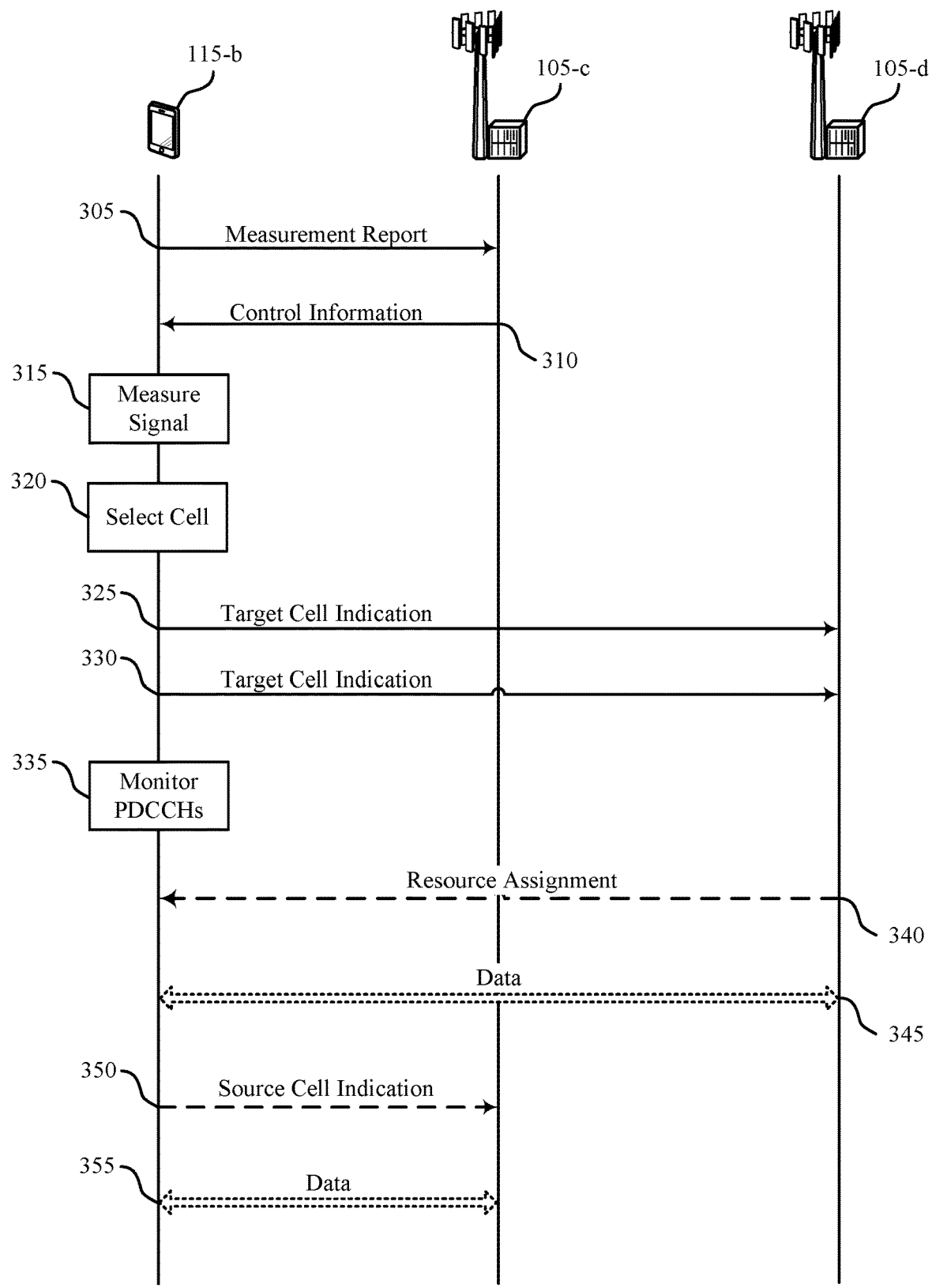
FIG. 3 illustrates an example of a process flow that supports UE autonomous serving cell selection in NR in accordance with various aspects of the present disclosure.

FIG. 3 illustrates an example of a process flow 300 that supports UE autonomous serving cell selection in NR in accordance with various aspects of the present disclosure. Process flow 300 illustrates aspects of techniques performed by a UE 115-b, which may be an example of a UE 115 described with reference to FIGS. 1 and 2. Process flow 300 also illustrates aspects of techniques performed by a base station 105-c and a base station 105-d, which may be examples of a base station 105 described with reference to FIGS. 1 and 2. Base station 105-c may be referred to as source base station 105-c (i.e., a source cell), and base station 105-d may be referred to as target base station 105-d (i.e., a target cell).

At 305, UE 115-b may transmit one or more measurement reports to source base station 105-c. The measurement reports may include a measurement report for source base station 105-c and one or more measurement reports for one or more of candidate base stations (e.g., including target base station 105-d). At 310, UE 115-b may receive control information from source base station 105-c (e.g., in response to the one or more measurement reports). The control information may include an indication of a range of values for at least one criterion for autonomous base station selection. The control information may also include an indication of a set of candidate base stations configured for autonomous base station selection.

At 315, UE 115-b may measure a signal for one or more of the candidate cells. The measurement of the signal may include a measurement of an RSRP, RSRQ, or an SINR, or any combination thereof. The criterion indicated at 310 may include a ratio of a first RSRP of source base station 105-c to a second RSRP of target base station 105-d, a ratio of a first RSRQ of source base station 105-c to a second RSRQ of target base station 105-d, or a ratio of a first SINR of source base station 105-c to a second SINR of target base station 105-d, or any combination thereof. UE 115-b may determine that the at least one criterion is within the range of values based at least in part on measuring the signal for the one or more candidate base stations.

At 320, UE 115-b may select target base station 105-d from the one or more candidate base stations or avoid selection of target base station 105-d after determining that the at least one criterion is within the range of values. In some cases, UE 115-b may select target base station 105-d based on radio conditions for communications with source base station 105-c.

At 325 and 330, UE 115-b may transmit the indication of target base station 105-d to source base station 105-c and to target base station 105-d, respectively. UE 115-b may transmit the indication on a set of resources previously identified (e.g., a random access channel (RACH)). In some cases, the identified resources may include a set of common resources, and, in other cases, the identified resources may include a first set of resources for source base station 105-c and a second set of resources for target base station 105-d. In some cases, base station 105-c may transmit RRC signaling, broadcast information, or downlink control information (DCI), or a combination thereof that indicates the resources on which to transmit the indication of target base station 105-d.

Base station 105-c may also transmit an indication of the transmit power to use to transmit the indication of target base station 105-d to source base station 105-c and target base station 105-d. The indication of the transmit power may include an indication of a common transmit power to use to transmit the indication of target base station 105-d to source base station 105-c and target base station 105-d. Alternatively, the indication of the transmit power may include an indication of a first transmit power to use to transmit the indication of target base station 105-d to source base station 105-c and a second transmit power to use to transmit the indication of target base station 105-d to target base station 105-d.

At 335, UE 115-b may monitor control channels (e.g., PDCCHs) for control information from both source base station 105-c and target base station 105-d. UE 115-b may monitor a first control channel of source base station 105-c during a first subset of a set of TTIs, and UE 115-b may monitor a second control channel of target base station 105-d during a second subset of the set of TTIs.

In some cases, at 340, UE 115-b may receive an assignment of resources from target base station 105-d. UE 115-b may receive the assignment of resources within a threshold time after transmitting the indication of target base station 105-d. Target base station 105-d may determine whether to assign resources for communication with UE 115-b. Target base station 105-d may transmit the assignment of resources or refrain from transmitting the assignment of resources to UE 115-b based on the determination. At 345, UE 115-b and target base station 105-d may communicate based on transmitting and receiving the assignment of resources.

Figure 4:
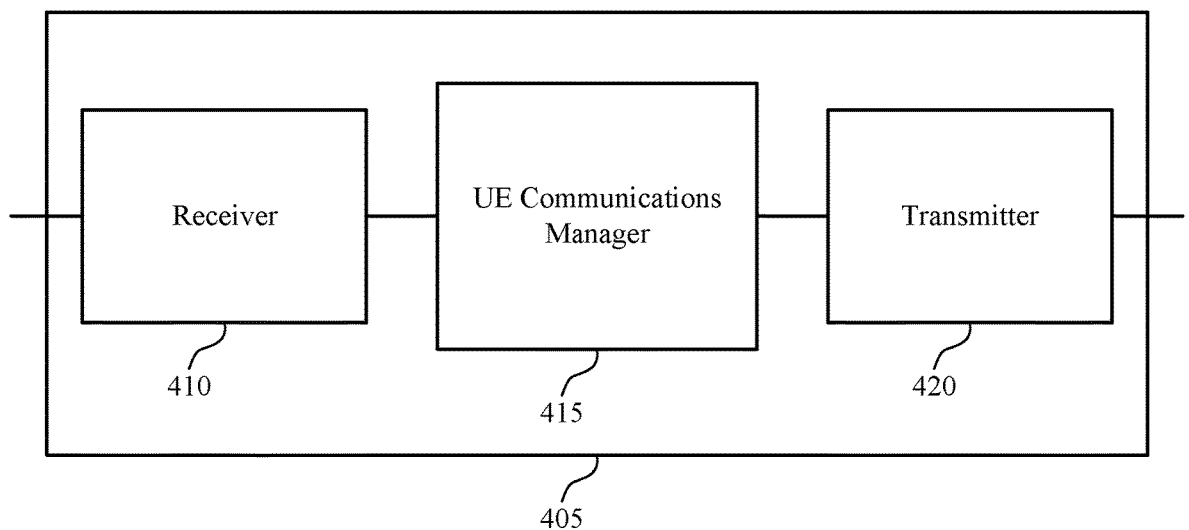
FIGS. 4-6 show block diagrams of a device or devices that support UE autonomous serving cell selection in NR in accordance with various aspects of the present disclosure.

In other cases, at 350, UE 115-b may transmit an indication of source base station 105-c to source base station 105-c. UE 115-b may transmit the indication of source base station 105-c after a threshold time after transmitting the indication of target base station 105-d. At 355, UE 115-b and source base station 105-c may communicate based on transmitting the indication of source base station 105-c. In some cases, in order to perform the handover described, UE 115-b may determine that a minimum time has elapsed since a previous handover. UE 115-b may then select target base station 105-d for the handover based on the determination that the minimum time has elapsed. FIG. 4 shows a block diagram 400 of a wireless device 405 that supports UE autonomous serving cell selection in NR in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to UE autonomous serving cell selection in NR, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 or at least some of its various sub-components may be implemented in hardware, software executed by a processor, firmware, or any combination thereof. If implemented in software executed by a processor, the functions of the UE communications manager 415 or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415 or at least some of its various sub-components may be physically located at various positions, including being distributed such that portions of functions are implemented at different physical locations by one or more physical devices. In some examples, UE communications manager 415 or at least some of its various sub-components may be a separate and distinct component in accordance with various aspects of the present disclosure. In other examples, UE communications manager 415 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive, from a source cell, a range of values for at least one criterion for autonomous cell selection, identify resources on which to transmit an indication of a target cell from a set of candidate cells configured for autonomous cell selection, measure a signal for one or more of the candidate cells, determine that the at least one criterion is within the range of values based on measuring the signal for the one or more candidate cells, and select the target cell from the one or more candidate cells or avoiding selection of the target cell after determining that the at least one criterion is within the range of values. In some cases, UE communications manager 415 may coordinate with receiver 410 and transmitter 420 to communicate with the target cell based on receiving an assignment of resources.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
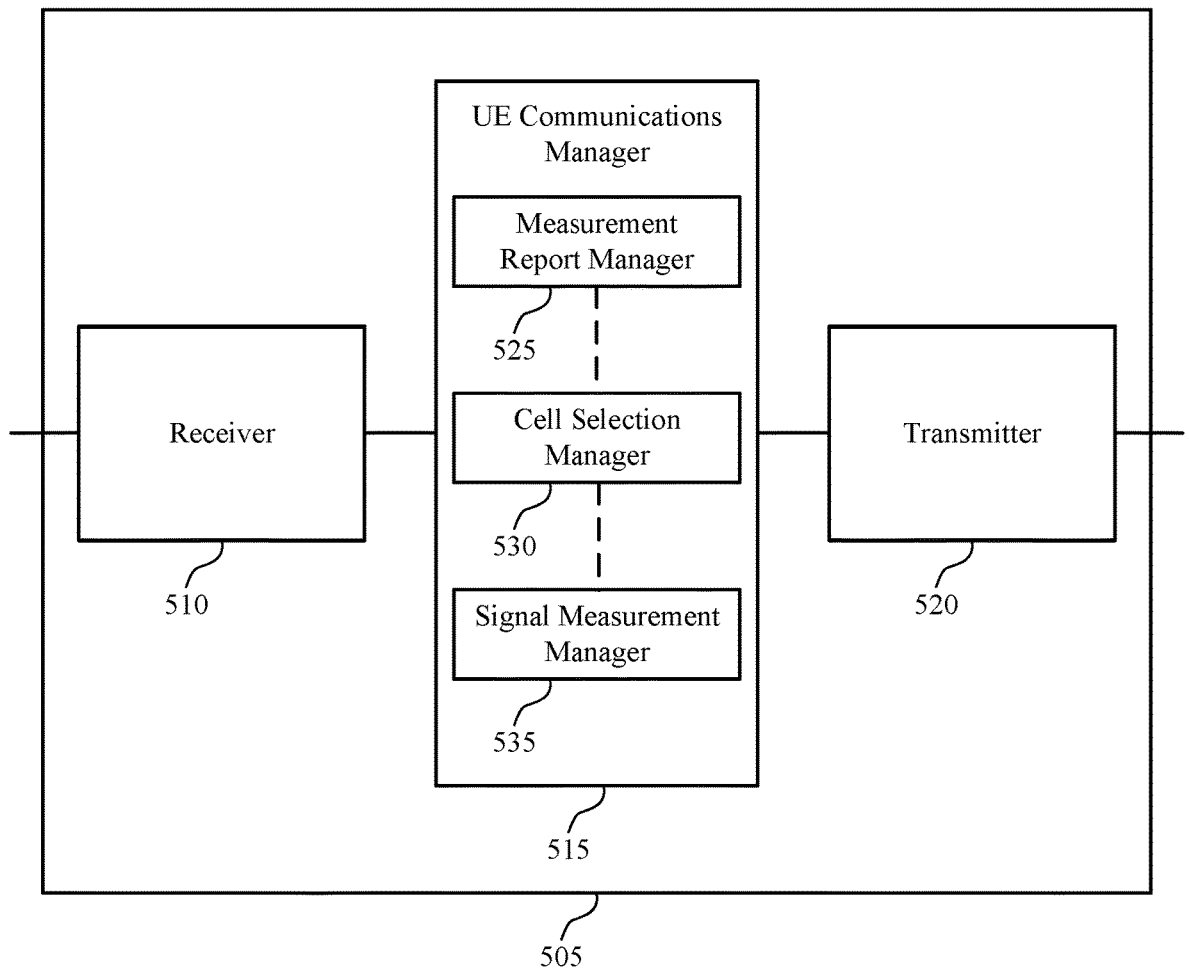

FIG. 5 shows a block diagram 500 of a wireless device 505 that supports UE autonomous serving cell selection in NR in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to UE autonomous serving cell selection in NR, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may include measurement report manager 525, cell selection manager 530, and signal measurement manager 535. Measurement report manager 525 may transmit one or more measurement reports to a source cell. In some cases, the one or more measurement reports include a measurement report for the source cell and one or more measurement reports for one or more of the candidate cells.

Cell selection manager 530 may receive, from a source cell (e.g., in response to the one or more measurement reports), a range of values for at least one criterion for autonomous cell selection. In some cases, cell selection manager 530 may determine that the at least one criterion is within the range of values based on measuring a signal for the one or more candidate cells. In some cases, cell selection manager 530 may select the target cell from the one or more candidate cells or avoid selection of the target cell after determining that the at least one criterion is within the range of values. In some cases, cell selection manager 530 may receive an indication of the set of candidate cells configured for autonomous cell selection. In some cases, cell selection manager 530 may transmit, to the source cell and to the target cell on the identified resources, the indication of the target cell. In some cases, cell selection manager 530 may identify resources on which to transmit the indication of a target cell from a set of candidate cells configured for autonomous cell selection.

In some cases, cell selection manager 530 may receive RRC signaling, broadcast information, or DCI, or a combination thereof that indicates the resources on which to transmit the indication of the target cell. In some cases, the RRC signaling includes unicast signaling or broadcast signaling. In some cases, the indication is transmitted to the source cell on a first set of resources of the identified resources and to the target cell on a second set of resources of the identified resources. In some cases, the at least one criterion includes a ratio of a first RSRP of the source cell to a second RSRP of the target cell, a ratio of a first RSRQ of the source cell to a second RSRQ of the target cell, or a ratio of a first SINR of the source cell to a second SINR of the target cell, or any combination thereof. In some cases, the target cell is selected based on radio conditions for communications with the source cell. In some cases, the identified resources include a set of common resources.

Signal measurement manager 535 may measure a signal for one or more of the candidate cells. In some cases, measuring the signal includes measuring at least one of an RSRP, RSRQ, or an SINR, or any combination thereof. Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
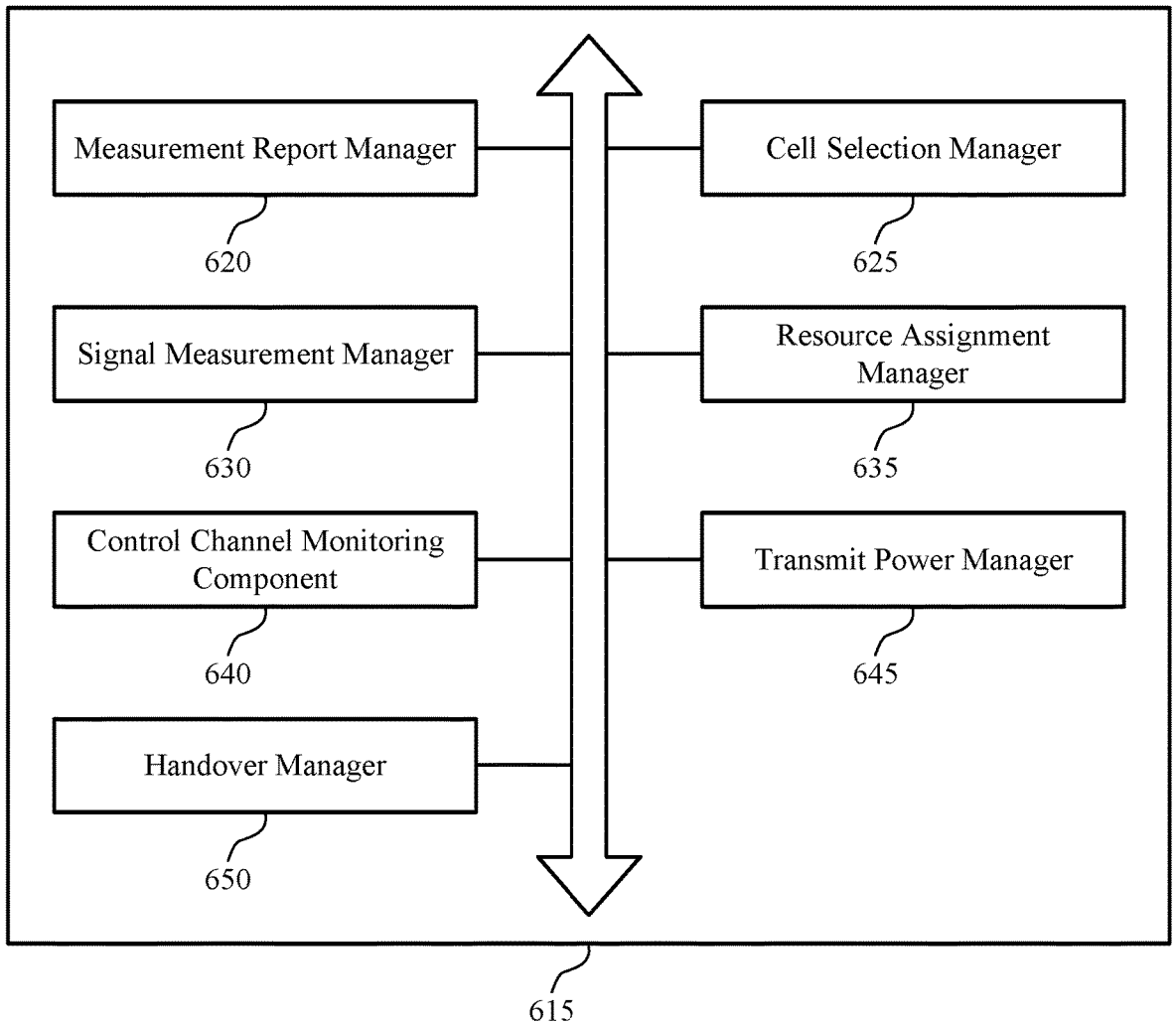

FIG. 6 shows a block diagram 600 of a UE communications manager 615 that supports UE autonomous serving cell selection in NR in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include measurement report manager 620, cell selection manager 625, signal measurement manager 630, resource assignment manager 635, control channel monitoring component 640, transmit power manager 645, and handover manager 650. Each of these modules may communicate, directly or indirectly, with one another (e.g., via one or more buses).

Measurement report manager 620 may transmit one or more measurement reports to a source cell. In some cases, the one or more measurement reports include a measurement report for the source cell and one or more measurement reports for one or more of the candidate cells.

Cell selection manager 625 may receive, from a source cell (e.g., in response to the one or more measurement reports), a range of values for at least one criterion for autonomous cell selection. In some cases, cell selection manager 625 may determine that the at least one criterion is within the range of values based on measuring the signal for the one or more candidate cells. In some cases, cell selection manager 625 may select the target cell from the one or more candidate cells or avoid selection of the target cell after determining that the at least one criterion is within the range of values. In some cases, cell selection manager 625 may receive an indication of the set of candidate cells configured for autonomous cell selection. In some cases, cell selection manager 625 may transmit, to the source cell and to the target cell on the identified resources, the indication of the target cell. In some cases, cell selection manager 625 may identify resources on which to transmit the indication of a target cell from the set of candidate cells configured for autonomous cell selection.

In some cases, cell selection manager 625 may receive RRC signaling, broadcast information, or DCI, or a combination thereof that indicates the resources on which to transmit the indication of the target cell. In some cases, the RRC signaling includes unicast signaling or broadcast signaling. In some cases, the indication is transmitted to the source cell on a first set of resources of the identified resources and to the target cell on a second set of resources of the identified resources. In some cases, the at least one criterion includes a ratio of a first RSRP of the source cell to a second RSRP of the target cell, a ratio of a first RSRQ of the source cell to a second RSRQ of the target cell, or a ratio of a first SINR of the source cell to a second SINR of the target cell, or any combination thereof. In some cases, the target cell is selected based on radio conditions for communications with the source cell. In some cases, the identified resources include a set of common resources.

Signal measurement manager 630 may measure a signal for one or more of the candidate cells. In some cases, measuring the signal includes measuring at least one of an RSRP, RSRQ, or an SINR, or any combination thereof. Resource assignment manager 635 may receive an assignment of resources from the target cell. In some cases, receiving the assignment of resources includes receiving the assignment of resources within a threshold time after transmitting the indication of the target cell. Control channel monitoring component 640 may monitor a first control channel of the source cell during a first subset of a set of TTIs after the indication of the target cell is transmitted and monitor a second control channel of the target cell during a second subset of the set of TTIs after the indication is transmitted.

Transmit power manager 645 may receive an indication of a transmit power to use to transmit the indication of the target cell to the source cell and the target cell. In some cases, the indication of the transmit power includes an indication of a common transmit power to use to transmit the indication of the target cell to the source cell and the target cell. In some cases, the indication of the transmit power includes an indication of a first transmit power to use to transmit the indication of the target cell to the source cell and a second transmit power to use to transmit the indication of the target cell to the target cell. Handover manager 650 may receive an indication of a minimum time between handovers, determine that the minimum time has elapsed since a previous handover, and select the source cell for a handover based on the determination that the minimum time has elapsed.

Figure 7:
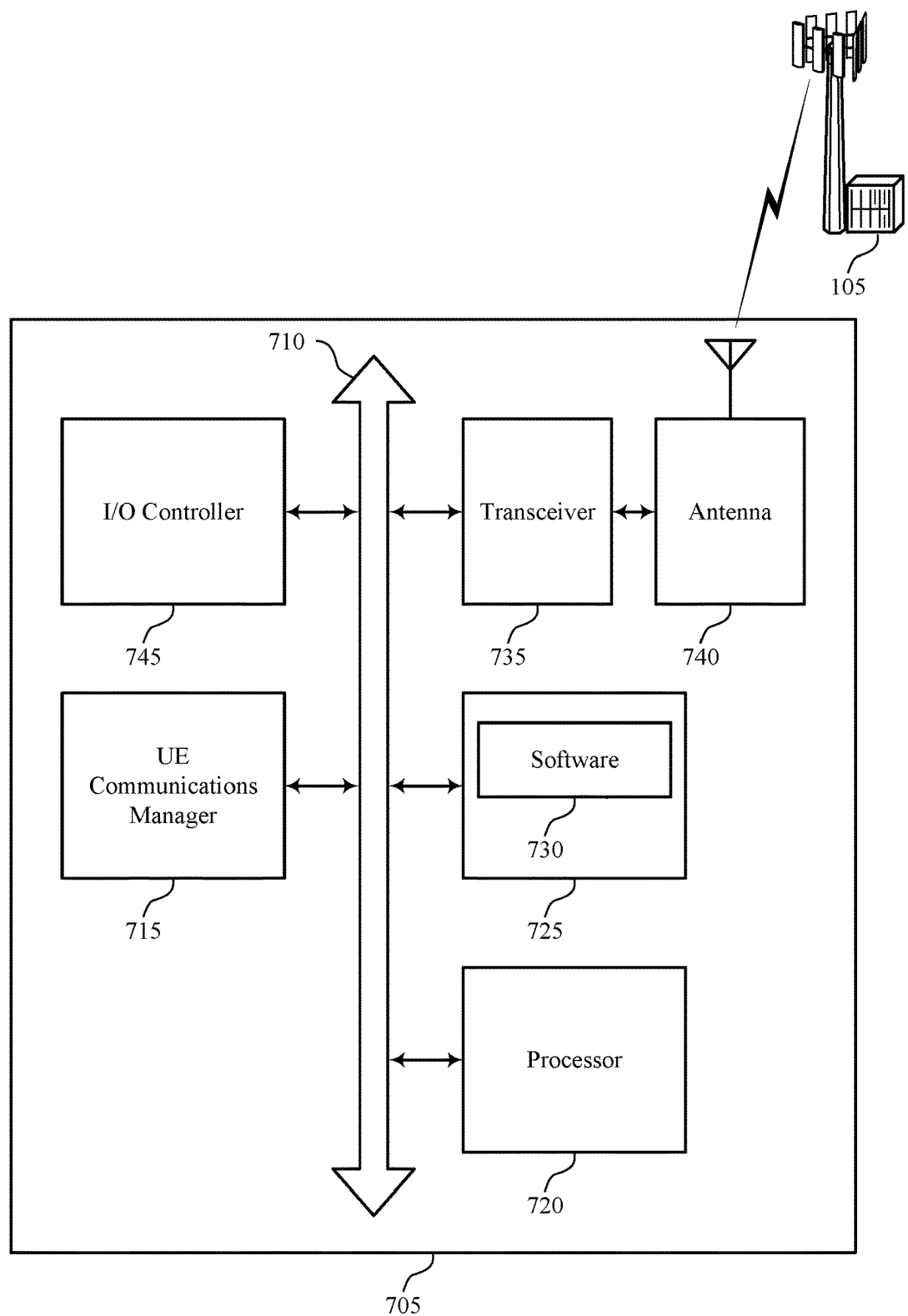
FIG. 7 illustrates a block diagram of a system including a device that supports UE autonomous serving cell selection in NR in accordance with various aspects of the present disclosure.

FIG. 7 shows a diagram of a system 700 including a device 705 that supports UE autonomous serving cell selection in NR in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more busses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting UE autonomous serving cell selection in NR).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support UE autonomous serving cell selection in NR. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
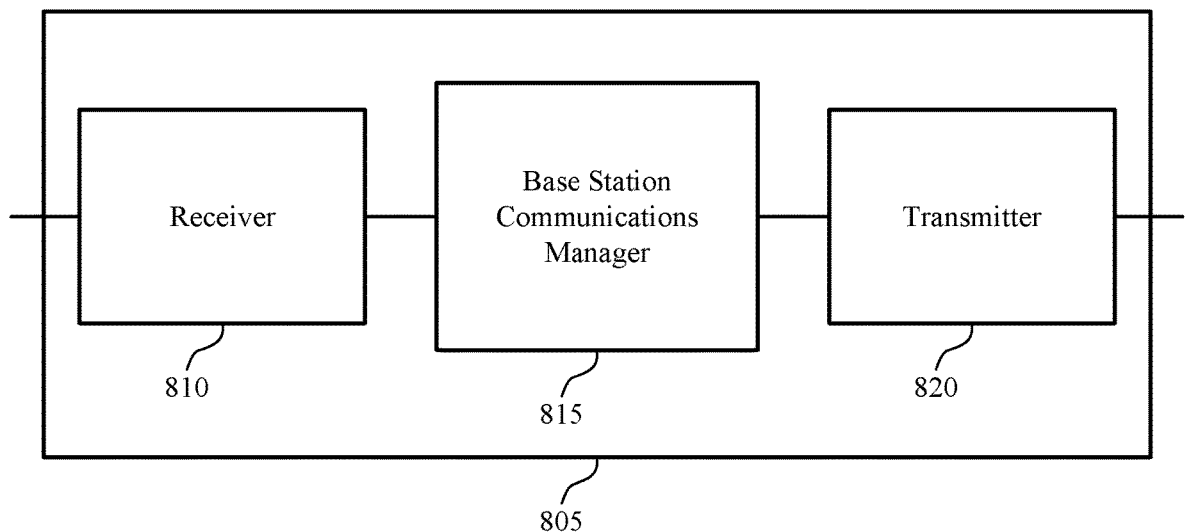
FIGS. 8-9 show block diagrams of a device or devices that support UE autonomous serving cell selection in NR in accordance with various aspects of the present disclosure.

FIG. 8 shows a block diagram 800 of a wireless device 805 that supports UE autonomous serving cell selection in NR in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to UE autonomous serving cell selection in NR, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 or at least some of its various sub-components may be implemented in hardware, software executed by a processor, firmware, or any combination thereof. If implemented in software executed by a processor, the functions of the base station communications manager 815 or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 or at least some of its various sub-components may be physically located at various positions, including being distributed such that portions of functions are implemented at different physical locations by one or more physical devices. In some examples, base station communications manager 815 or at least some of its various sub-components may be a separate and distinct component in accordance with various aspects of the present disclosure. In other examples, base station communications manager 815 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may transmit, to a UE, a range of values for at least one criterion for autonomous cell selection, identify resources to monitor for an indication of a target cell from a set of candidate cells configured for autonomous cell selection, and receive, from the UE on the identified resources, the indication of the target cell. The base station communications manager 815 may also identify resources to monitor for an indication of the target cell from a set of candidate cells configured for autonomous cell selection, receive, from a UE on the identified resources, the indication of the target cell, and determine whether to assign resources for communication with the UE. Base station communications manager 815 may coordinate with receiver 810 and transmitter 820 to communicate with the UE based on receiving an indication of the source cell.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas. Transmitter 820 may transmit an assignment of resources or refrain from transmitting an assignment of resources to the UE based on the determination, and communicate with the UE based on transmitting the assignment of resources.

Figure 9:
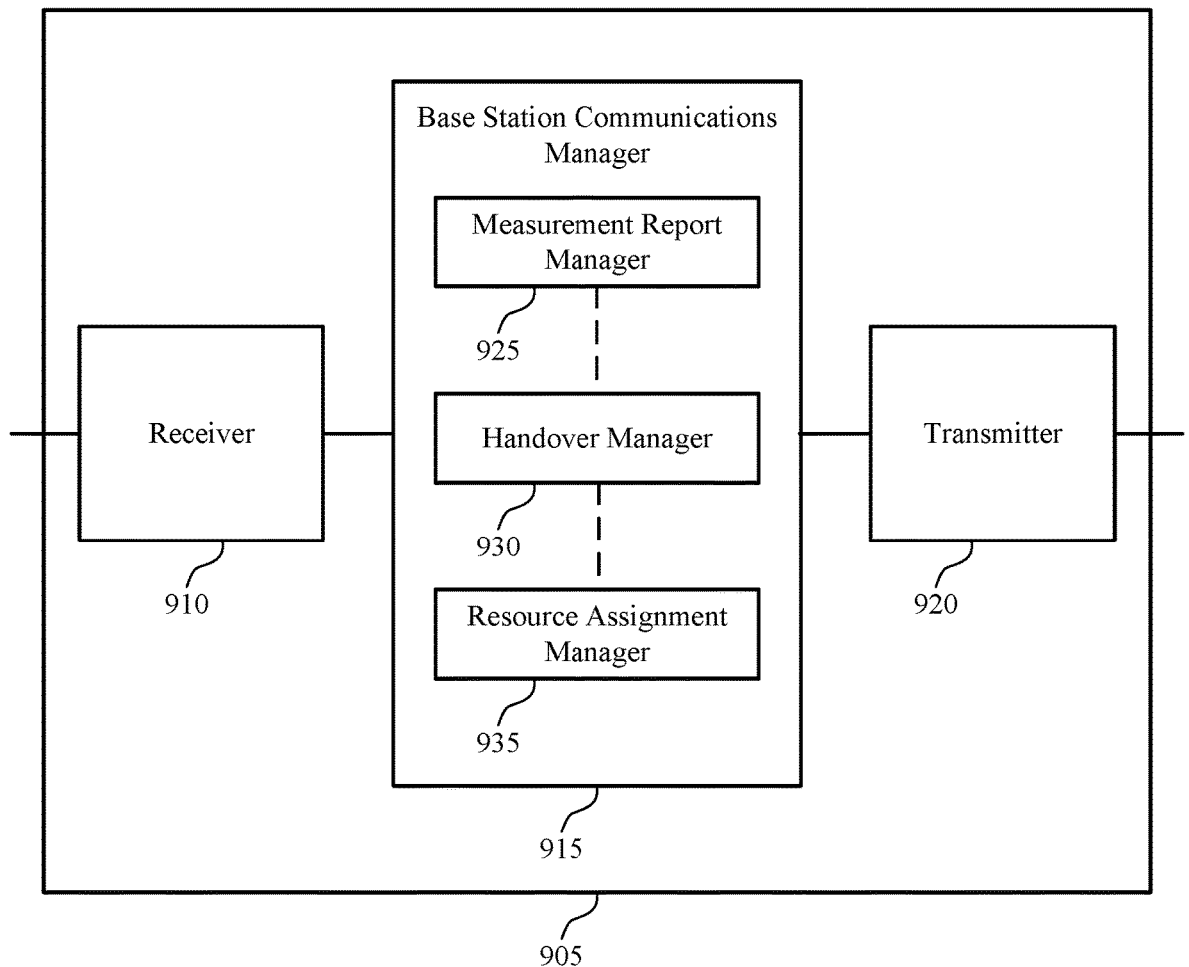

FIG. 9 shows a block diagram 900 of a wireless device 905 that supports UE autonomous serving cell selection in NR in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to UE autonomous serving cell selection in NR, etc.). Information may be passed on to other components of the device. The receiver 910 may be an example of aspects of the transceiver 1035 described with reference to FIG. 10. The receiver 910 may utilize a single antenna or a set of antennas.

Base station communications manager 915 may be an example of aspects of the base station communications manager 1015 described with reference to FIG. 10. Base station communications manager 915 may include measurement report manager 925, handover manager 930, and resource assignment manager 935. Measurement report manager 925 may receive one or more measurement reports from a UE.

Handover manager 930 may transmit, to a UE (e.g., in response to the one or more measurement reports), a range of values for at least one criterion for autonomous cell selection, identify resources to monitor for an indication of a target cell from a set of candidate cells configured for autonomous cell selection, receive, from the UE on the identified resources, the indication of the target cell, receive, from the UE, an indication of the source cell after a threshold time after receiving the indication of the target cell, identify resources to monitor for an indication of the target cell from a set of candidate cells configured for autonomous cell selection, and receive, from a UE on the identified resources, the indication of the target cell.

Resource assignment manager 935 may determine whether to assign resources for communication with the UE. Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
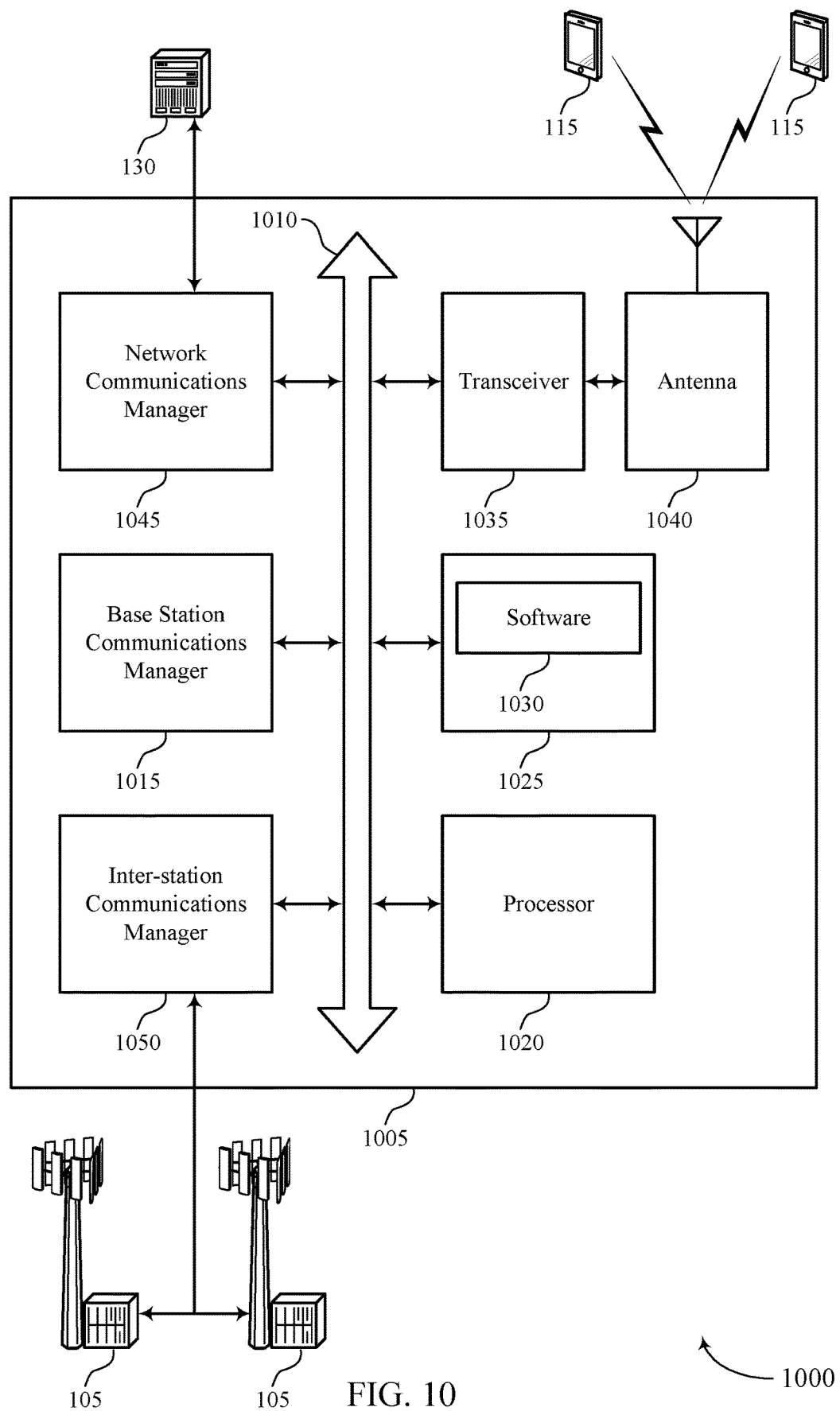
FIG. 10 illustrates a block diagram of a system including a device, such as a base station, that supports UE autonomous serving cell selection in NR in accordance with various aspects of the present disclosure.

FIG. 10 shows a diagram of a system 1000 including a device 1005 that supports UE autonomous serving cell selection in NR in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting UE autonomous serving cell selection in NR).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support UE autonomous serving cell selection in NR. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
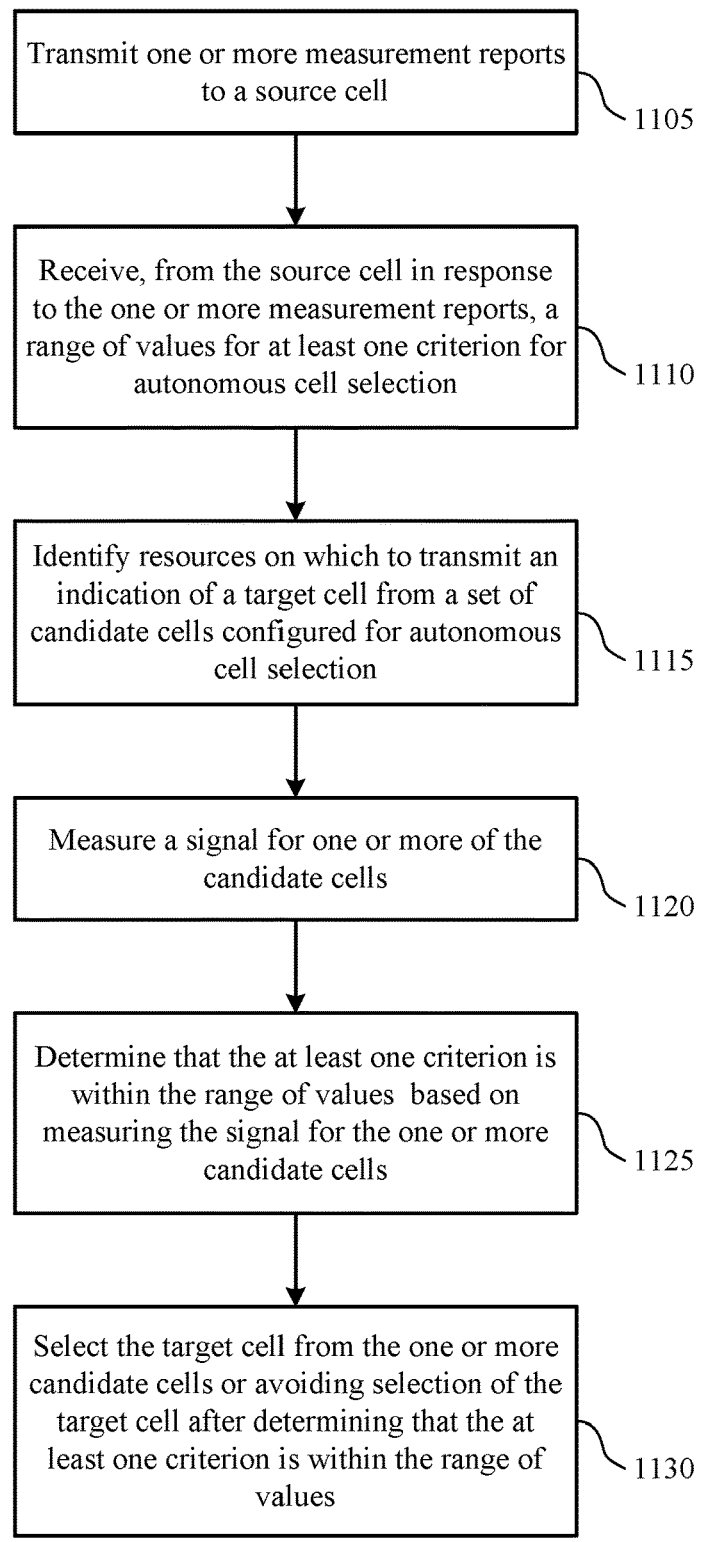
FIGS. 11-13 illustrate methods for UE autonomous serving cell selection in NR in accordance with various aspects of the present disclosure.

FIG. 11 shows a flowchart illustrating a method 1100 for UE autonomous serving cell selection in NR in accordance with aspects of the present disclosure. The operations of method 1100 may be implemented by a UE 115 or its components as described herein. For example, the operations of method 1100 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may receive, from a source cell, a range of values for at least one criterion for autonomous cell selection. The operations of block 1105 may be performed according to the methods described herein. In certain examples, aspects of the operations of block 1105 may be performed by a cell selection manager as described with reference to FIGS. 4 through 7.

At block 1110 the UE 115 may identify resources on which to transmit an indication of a target cell from a set of candidate cells configured for autonomous cell selection. The operations of block 1110 may be performed according to the methods described herein. In certain examples, aspects of the operations of block 1110 may be performed by a cell selection manager as described with reference to FIGS. 4 through 7.

At block 1115 the UE 115 may measure a signal for one or more of the candidate cells. The operations of block 1115 may be performed according to the methods described herein. In certain examples, aspects of the operations of block 1115 may be performed by a signal measurement manager as described with reference to FIGS. 4 through 7.

At block 1120 the UE 115 may determine that the at least one criterion is within the range of values based at least in part on measuring the signal for the one or more candidate cells. The operations of block 1120 may be performed according to the methods described herein. In certain examples, aspects of the operations of block 1120 may be performed by a cell selection manager as described with reference to FIGS. 4 through 7.

At block 1125 the UE 115 may select the target cell from the one or more candidate cells or avoiding selection of the target cell after determining that the at least one criterion is within the range of values. The operations of block 1125 may be performed according to the methods described herein. In certain examples, aspects of the operations of block 1125 may be performed by a cell selection manager as described with reference to FIGS. 4 through 7.

Figure 12:
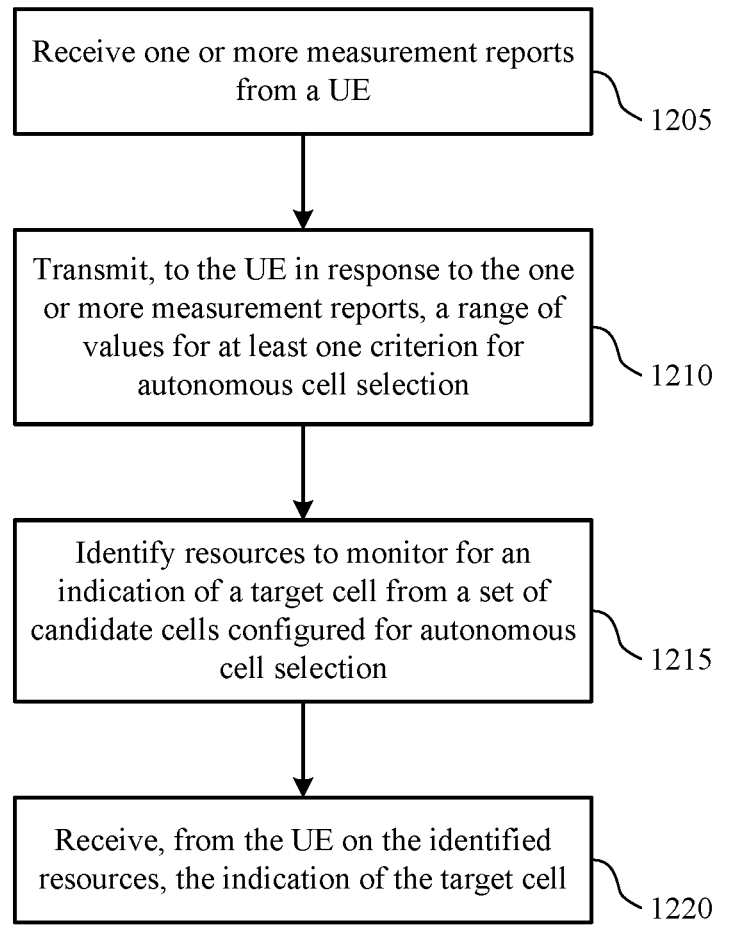

FIG. 12 shows a flowchart illustrating a method 1200 for UE autonomous serving cell selection in NR in accordance with aspects of the present disclosure. The operations of method 1200 may be implemented by a base station 105 or its components as described herein. For example, the operations of method 1200 may be performed by a base station communications manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At block 1205 the base station 105 may transmit, to a UE, a range of values for at least one criterion for autonomous cell selection. The operations of block 1205 may be performed according to the methods described herein. In certain examples, aspects of the operations of block 1205 may be performed by a handover manager as described with reference to FIGS. 8 through 10.

At block 1210 the base station 105 may identify resources to monitor for an indication of a target cell from a set of candidate cells configured for autonomous cell selection. The operations of block 1210 may be performed according to the methods described herein. In certain examples, aspects of the operations of block 1210 may be performed by a handover manager as described with reference to FIGS. 8 through 10.

At block 1215 the base station 105 may receive, from the UE on the identified resources, the indication of the target cell. The operations of block 1215 may be performed according to the methods described herein. In certain examples, aspects of the operations of block 1215 may be performed by a handover manager as described with reference to FIGS. 8 through 10.

Figure 13:
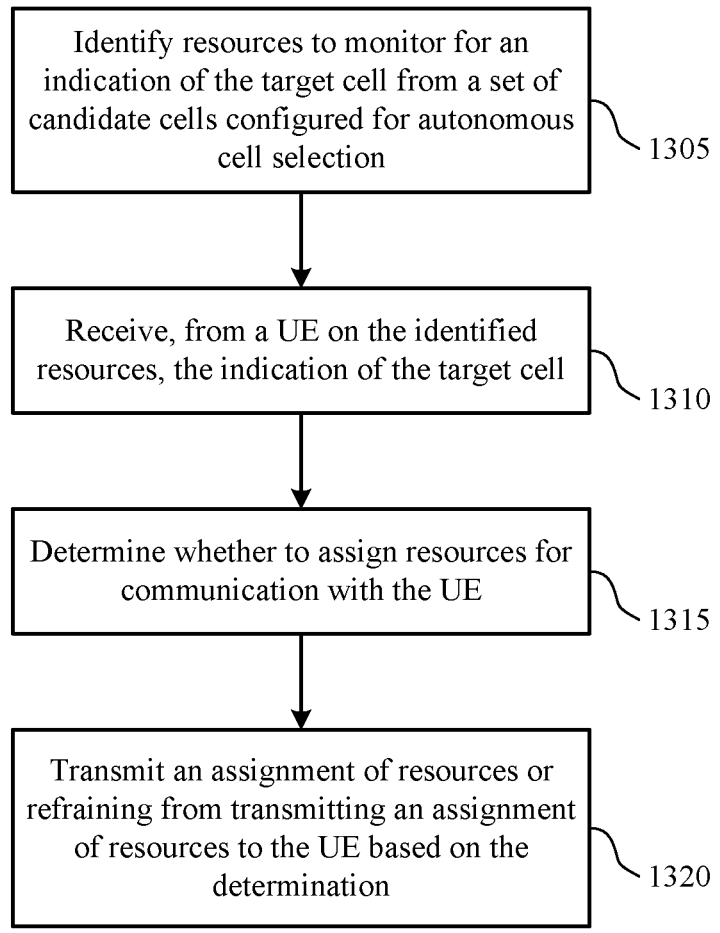

FIG. 13 shows a flowchart illustrating a method 1300 for UE autonomous serving cell selection in NR in accordance with aspects of the present disclosure. The operations of method 1300 may be implemented by a base station 105 or its components as described herein. For example, the operations of method 1300 may be performed by a base station communications manager as described with reference to FIGS. 8 through 10. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify resources to monitor for an indication of the target cell from a set of candidate cells configured for autonomous cell selection. The operations of block 1305 may be performed according to the methods described herein. In certain examples, aspects of the operations of block 1305 may be performed by a handover manager as described with reference to FIGS. 8 through 10.

At block 1310 the base station 105 may receive, from a UE on the identified resources, the indication of the target cell. The operations of block 1310 may be performed according to the methods described herein. In certain examples, aspects of the operations of block 1310 may be performed by a handover manager as described with reference to FIGS. 8 through 10.

At block 1315 the base station 105 may determine whether to assign resources for communication with the UE. The operations of block 1315 may be performed according to the methods described herein. In certain examples, aspects of the operations of block 1315 may be performed by a resource assignment manager as described with reference to FIGS. 8 through 10.

At block 1320 the base station 105 may transmit an assignment of resources or refraining from transmitting an assignment of resources to the UE based at least in part on the determination. The operations of block 1320 may be performed according to the methods described herein. In certain examples, aspects of the operations of block 1320 may be performed by a transmitter as described with reference to FIGS. 8 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
   one or more processors;
   memory coupled with the one or more processors; and
   instructions stored in the memory and executable by the one or more processors to cause the apparatus to:
      receive, from a source cell, first control information indicating a range of values for at least one criterion for UE autonomous cell selection;

transmit, to the source cell and a target cell, an indication of the target cell for handover in accordance with the at least one criterion associated with the target cell being within the range of values;
monitor a first control channel of the source cell for second control information during a first subset of a set of transmission intervals,
the set of transmission intervals corresponding to a threshold time after transmitting the indication of the target cell; and
monitor a second control channel of the target cell for an assignment of resources during a second subset of the set of transmission intervals corresponding to the threshold time after transmitting the indication of the target cell.

2. The apparatus of claim 1, wherein the instructions are further executable by the one or more processors to cause the apparatus to:
receive, from the target cell, the assignment of resources in accordance with the monitoring the second control channel of the target cell; and
establish a connection with the target cell in response to the receiving the assignment of resources from the target cell.

3. The apparatus of claim 1, wherein the instructions are further executable by the one or more processors to cause the apparatus to:
transmit, to the source cell, an indication of the source cell in response to failing to receive the assignment of resources from the target cell within the threshold time; and
maintain a connection with the source cell in accordance with the transmitting the indication of the source cell.

4. The apparatus of claim 1, wherein the instructions are further executable by the one or more processors to cause the apparatus to:
measure a signal for one or more candidate cells,
wherein the one or more candidate cells comprise the target cell, and
wherein the at least one criterion associated with the target cell is within the range of values in accordance with the measuring.

5. The apparatus of claim 4, wherein:
the at least one criterion corresponds to a first reference signal received power (RSRP) for the source cell and a second RSRP for the target cell, a first reference signal received quality (RSRQ) for the source cell and a second RSRQ for the target cell, or a first signal-to-interference-plus-noise ratio (SINR) for the source cell and a second SINR for the target cell, or a combination thereof in accordance with the measuring.

6. The apparatus of claim 1, wherein the instructions are further executable by the one or more processors to cause the apparatus to:
initiate a handover procedure to the target cell in response to a quality of radio conditions associated with communications with the source cell falling below a threshold,
wherein the indication of the target cell for handover is transmitted in accordance with the handover procedure.

7. The apparatus of claim 1, wherein the instructions are further executable by the one or more processors to cause the apparatus to:
receive radio resource control (RRC) signaling, broadcast information, or downlink control information (DCI), or a combination thereof indicating one or more resources on which to transmit the indication of the target cell,
wherein the indication of the target cell for handover is transmitted in accordance with the RRC signaling, the broadcast information, or the DCI, or the combination thereof.

8. The apparatus of claim 7, wherein:
the one or more resources comprise a first set of resources configured for transmitting the indication of the target cell to the source cell and a second set of resources configured for transmitting the indication of the target cell to the target cell.

9. The apparatus of claim 7, wherein:
the one or more resources comprise a common set of resources for transmitting the indication of the target cell to both the source cell and the target cell.

10. The apparatus of claim 1, wherein the instructions are further executable by the one or more processors to cause the apparatus to:
transmit, to the source cell, one or more measurement reports for the source cell, or the target cell, or both,
wherein the first control information is received in accordance with the one or more measurement reports.

11. The apparatus of claim 10, wherein:
the first control information further indicates a set of candidate cells configured for the UE autonomous cell selection, the set of candidate cells comprising at least the target cell.

12. A method for wireless communications at a user equipment (UE), comprising:
receiving, from a source cell, first control information indicating a range of values for at least one criterion for UE autonomous cell selection;
transmitting, to the source cell and a target cell, an indication of the target cell for handover in accordance with the at least one criterion associated with the target cell being within the range of values;
monitoring a first control channel of the source cell for second control information during a first subset of a set of transmission intervals,
the set of transmission intervals corresponding to a threshold time after transmitting the indication of the target cell; and
monitoring a second control channel of the target cell for an assignment of resources during a second subset of the set of transmission intervals corresponding to the threshold time after transmitting the indication of the target cell.

13. The method of claim 12, further comprising:
receiving, from the target cell, the assignment of resources in accordance with the monitoring the second control channel of the target cell; and
establishing a connection with the target cell in response to the receiving the assignment of resources from the target cell.

14. The method of claim 12, further comprising:
transmitting, to the source cell, an indication of the source cell in response to failing to receive the assignment of resources from the target cell within the threshold time; and
maintaining a connection with the source cell in accordance with the transmitting the indication of the source cell.

15. The method of claim 12, further comprising:
measuring a signal for one or more candidate cells,
wherein the one or more candidate cells comprise the target cell, and wherein the at least one criterion associated with the target cell is within the range of values in accordance with the measuring.

16. The method of claim 12, further comprising:
initiating a handover procedure to the target cell in response to a quality of radio conditions associated with communications with the source cell falling below a threshold,
wherein the indication of the target cell for handover is transmitted in accordance with the handover procedure.

17. The method of claim 12, further comprising:
receiving radio resource control (RRC) signaling, broadcast information, or downlink control information (DCI), or a combination thereof indicating one or more resources on which to transmit the indication of the target cell,
wherein the indication of the target cell for handover is transmitted in accordance with the RRC signaling, the broadcast information, or the DCI, or the combination thereof.

18. The method of claim 12, further comprising:
transmitting, to the source cell, one or more measurement reports for the source cell, or the target cell, or both,
wherein the first control information is received in accordance with the one or more measurement reports.

19. The method of claim 18, wherein:
the first control information further indicates a set of candidate cells configured for the UE autonomous cell selection, the set of candidate cells comprising at least the target cell.

20. A non-transitory computer-readable medium storing code for wireless communications at a user equipment (UE), the code comprising instructions executable by one or more processors to:
receive, from a source cell, first control information indicating a range of values for at least one criterion for UE autonomous cell selection;
transmit, to the source cell and a target cell, an indication of the target cell for handover in accordance with the at least one criterion associated with the target cell being within the range of values;
monitor a first control channel of the source cell for second control information during a first subset of a set of transmission intervals,
the set of transmission intervals corresponding to a threshold time after transmitting the indication of the target cell; and
monitor a second control channel of the target cell for an assignment of resources during a second subset of the set of transmission intervals corresponding to the threshold time after transmitting the indication of the target cell.

* * * * *